United States Patent
Peterson et al.

(10) Patent No.: US 7,440,044 B2
(45) Date of Patent: Oct. 21, 2008

(54) COLOR DISPLAY DEVICE AND METHOD

(75) Inventors: Charles M. Peterson, Sammamish, WA (US); Gene Koch, Bayville, NJ (US); Sanji Arisawa, Joetsu (JP); Yuichi Aoki, Joetsu (JP)

(73) Assignee: Arisawa Manufacturing Co., Ltd., Niigata-ken (JP)

( * ) Notice: Subject to any disclaimer, the term of this patent is extended or adjusted under 35 U.S.C. 154(b) by 557 days.

(21) Appl. No.: 10/997,994

(22) Filed: Nov. 29, 2004

(65) Prior Publication Data

US 2006/0114371 A1   Jun. 1, 2006

(51) Int. Cl.
*G02F 1/1335* (2006.01)

(52) U.S. Cl. ............................. 349/61; 349/71; 313/503

(58) Field of Classification Search ............... 349/61, 349/71; 313/503
See application file for complete search history.

(56) References Cited

U.S. PATENT DOCUMENTS

| | | | |
|---|---|---|---|
| 6,295,106 B1 * | 9/2001 | Fukuzawa et al. | 349/41 |
| 2002/0067443 A1 * | 6/2002 | Bayley et al. | 349/61 |
| 2002/0149725 A1 * | 10/2002 | Hashimoto | 349/117 |
| 2004/0135495 A1 | 7/2004 | Wu et al. | |

* cited by examiner

*Primary Examiner*—David C. Nelms
*Assistant Examiner*—David Y Chung
(74) *Attorney, Agent, or Firm*—Ronald D. Trice (57) ABSTRACT

A color display having a monochromatic light source, an optical switch and an array of pixels formed of anisotropically emitting photoluminescent material may be combined such that large losses often associated with color filter and polarizers are avoided such that a high efficient display results. The optical switch may be a liquid crystal device that is tuned to the wavelength of the monochromatic light source. The monochromatic light source may be made from OLED material that emits in the violet, near UV or blue spectrum and may be polarized. The array of pixels may include a transmissive pixel when the backlight spectrum is the same as the color of one of the pixels.

56 Claims, 6 Drawing Sheets

COLOR DISPLAY DEVICE AND METHOD

CROSS-REFERENCE TO RELATED APPLICATIONS

This application is related to U.S. patent application Ser. No. 10/997,970, entitled "COLOR DISPLAY DEVICE AND METHOD" filed on Nov. 29, 2004.

FIELD OF THE INVENTION

The present invention relates generally to color display devices and methods, and more particularly, to color display devices including photoluminescent elements and methods.

BACKGROUND

Display devices having color elements typically have a low light utilization efficiency that results from a number of different factors. For example, the inclusion of color filters often results in the absorption of two thirds (⅔) of the light by the color filters and the inclusion of an absorptive polarizer often results in the absorption of half (½) of the light by the polarizer. In addition to polarizers and color filters, the other elements in the color display device may further reduce light utilization efficiency to as little as 3%. Because the light utilization efficiency affects battery life, light source life, display life, the power requirements, optical design and much more, there has been and continues to be a strong impetus to increase the light utilization efficiency. This is lead to a number of improvements to increase light utilization efficiency. For example, fluorescent material has been used to form color elements that are stimulated by a violet or near UV spectrum back light such that improved light utilization efficiency results. Unfortunately, the improved light utilization efficiency of such "improved" color display devices degrades various other performance characteristics such as contrast ratio, viewing angle (contrast ratio over field of view), and stability of color rendition over field of view and others. For example, in the above fluorescent color display device, this degradation may result because the distance between the switching element and the fluorescent material is increased as compared to the distance between the switching element and the color material in a color display device with color filters. This increased distance allows light from the back light to bleed into adjacent pixels (sometimes referred to as a parallax problem) and thereby reduce the quality of the displayed image. Of course many other "improved" configurations are known to those skilled in the art. Unfortunately, the improved light utilization efficiency of such prior art devices has invariably required some trade-off. Accordingly, there is a strong need in the art for color display devices and methods for improving light utilization efficiency without sacrificing other performance characteristics.

SUMMARY OF THE INVENTION

An aspect of the present invention is to provide a color display including a monochromatic light source, an array of pixel elements and an optical switch between the monochromatic light source and the array of pixel elements. At least some of the array of pixel elements include anisotropically emitting photoluminescent material.

Another aspect of the invention is to provide a method of displaying a color image including generating a monochromatic light, modulating the monochromatic light such that modulated monochromatic light results and selectively converting at least a portion of the modulated monochromatic light into light of different wavelengths with anisotropically emitting photoluminescent material.

BRIEF DESCRIPTION OF THE DRAWINGS

The invention will be described in detail with reference to the following drawings in which like reference numerals refer to like elements wherein.

DETAILED DESCRIPTION

Figure 1:
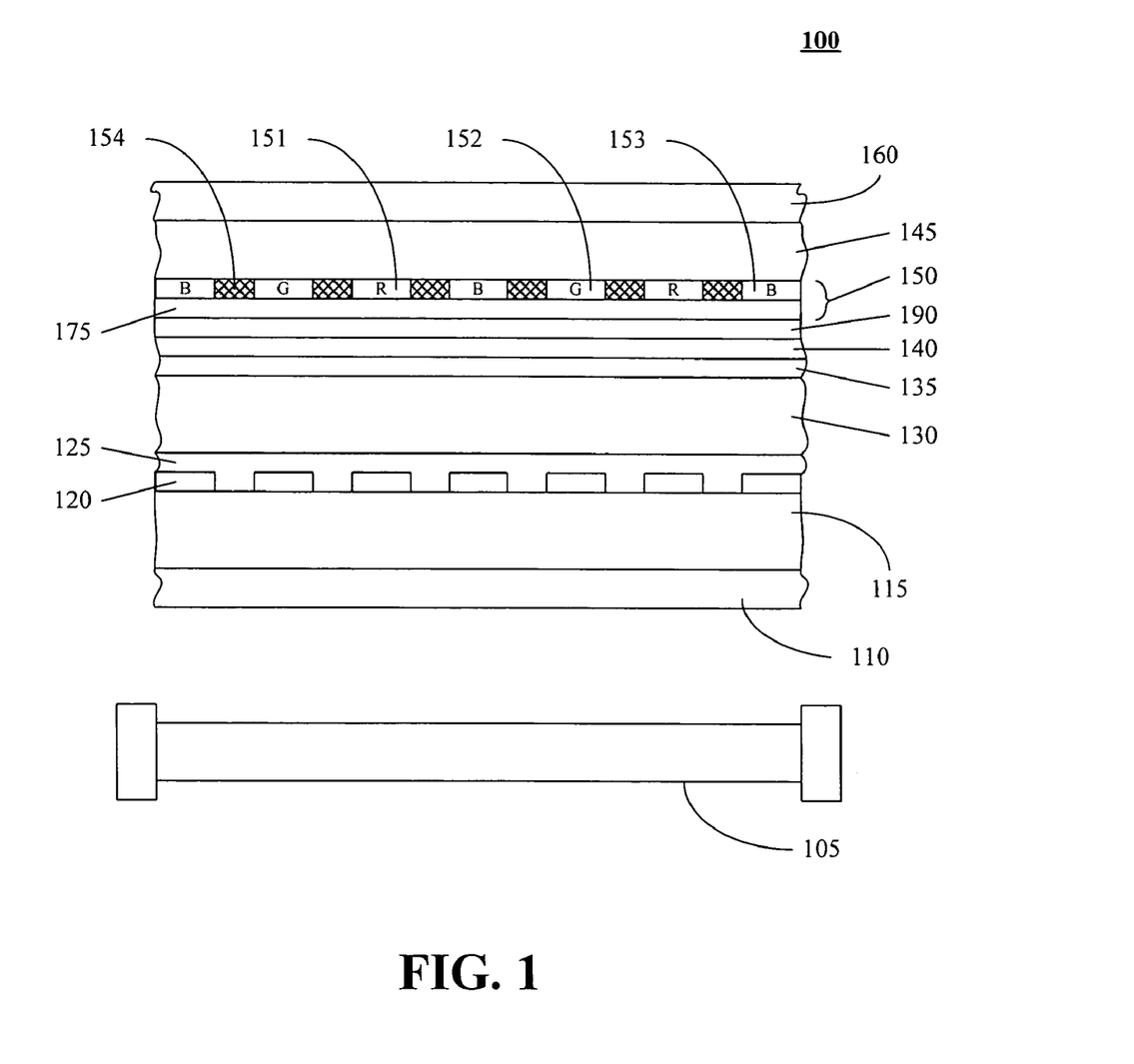
FIG. 1 illustrates an exemplary color display device according to an embodiment of the invention.

FIG. 1 illustrates an exemplary color display device 100 including a backlight assembly 105, a first linear sheet polarizer 110, a first transparent substrate 115, an array of transparent electrodes 120, a first liquid crystal alignment layer 125, a layer of liquid crystal 130, a second liquid crystal alignment layer 135, a transparent counter electrode or electrodes 140, a second substrate 145, an array of anisotropically photoluminescent color elements 150, a second linear sheet polarizer 160, a transparent overcoat or passivation layer 175 and a selectively reflecting mirror 190. The array of anisotropically photoluminescent color elements 150 may include red light emitting elements 151, green light emitting elements 152, and blue light emitting elements 153. Alternatively, the array of anisotropically photoluminescent color elements 150 may be any other suitable set of colored light emitting elements. The photoluminescent color elements may contain pure anisotropically photoluminescent material, or the mixture of photoluminescent material with anisotropic non-photoluminescent material. The photoluminescent material in the mixture may be anisotropic, or isotropic. Furthermore, the photoluminescent materials may have a structure that is isotropic or anisotropoic (e.g., chiral or linearly aligned) and may be included in a feedback enhanced or laser cavity. The photoluminescent materials also may have internal structure such as variations in refractive index.

The anisotropically photoluminescent color elements 150 may be made from materials with low self-absorption or any other suitable material. A first exemplary material has formula:

and is more fully discussed in U.S. patent application Ser. Nos. 10/187,381 and 10/187,396, which are incorporated herein in their entirety by this reference. A second exemplary material (PV235) and a third exemplary material (PV237) have the formulas and may be synthesized as indicated below:

-continued a ... 1-bromooctane, TBAB, Toluene, NaOH solution (50%), 65° C.
b ... 2-(tributylstannyl)-thiophene, Pd(PPh$_3$)$_4$, DMF, 80° C.
c ... N-bromosuccinimide, DCM, reflux.
d ... 1-bromooctane, K$_2$CO$_3$, butanone, reflux.
e ... 2-(tributylstannyl)-thiophene, Pd(PPh$_3$)$_4$, DMF, 80° C.
f ... (i) n-BuLi, THF (dry), -78° C., (ii) ClSn(But)$_3$, RT.
g ... Pd(PPh$_3$)$_4$, DMF, 90° C.
h ... (i) BBr$_3$, DCM, 0° C., (ii) H$_2$O (ice).
i ... K$_2$CO$_3$, DMF, 90° C.

The array of anisotropically photoluminescent color elements 150 may have a black matrix 154 between the light emitting elements such that light not directly impinging on and passing through them is substantially or completely absorbed. Alternatively, the black matrix 154 may be formed above and/or below the array of anisotropically photoluminescent color elements 150.

The first transparent substrate 115 may be formed from any suitable material including glass and plastic substrates. The first transparent substrate 115 has the first linear sheet polarizer 110 attached to its bottom surface and the array of transparent electrodes 120 formed on the top surface of the first transparent substrate 115. The first liquid crystal alignment layer 125 may be formed on the top surface of the first transparent substrate 115 and on top of the array of transparent electrodes 120. The layer of liquid crystal 130 is aligned by the first liquid crystal alignment layer 125 and the second liquid crystal alignment layer 135. The transparent counter electrode or electrodes 140 may be a single common electrode that overlaps all display elements. The second linear sheet polarizer 160 acts as a clean up polarizer and also absorbs ambient light. The second linear sheet polarizer 160 may be omitted since the second linear sheet polarizer 160 is not acting as an analyzer (e.g., determining whether a pixel is on or off according to the polarization direction of light transmitted therethrough). Alternatively, the sheet polarizers may be other kinds of polarizing elements such as wire grid polarizers and may be combined with other elements such as using the polarizer as a substrate. Alternatively, the first linear sheet polarizer 110 may be thin crystalline film polarizer coated above the first transparent electrode.

Each anisotropically photoluminescent color element 151, 152, 153 is spatially registered to a corresponding electrode element in the array of transparent electrodes 120. The color display device 100 is illustrated with a selectively reflecting mirror 190 interposed between the second transparent electrode array 140 and the array of anisotropically photoluminescent color elements 150. The selectively reflecting mirror 190 may be a multilayer dielectric mirror that reflects the light emitted by the corresponding anisotropically photoluminescent color elements 151, 152, 153, but which transmits the light emitted by the backlight assembly 105. In this way light emitted from the anisotropically photoluminescent color elements 151, 152, 153 back towards the backlight assembly 105 is reflected back towards the viewer. Alternatively, the selectively reflecting mirror 190 may be a silver halide holographic optical element, a cholesteric liquid crystal reflector or any other suitable element that passes light from the backlight assembly 105 and reflects light from the anisotropically photoluminescent color elements 151, 152, 153.

The emission of backlight assembly 105 is selected such that its emission spectrum peak or peaks matches to the excitation spectrum peak or peaks of the anisotropically photoluminescent color elements 151, 152, 153 so as to efficiently convert the light from the backlight assembly 105 into the desired display colors. Any suitable backlight assembly may be used. One exemplary backlight assembly 105 contains a fluorescent tube. Another exemplary backlight assembly 105 is a near ultraviolet (e.g., 320 to 390 nm) or violet (e.g., 390 nm to 455 nm) organic light emitting device (OLED). This OLED based backlight assembly 105 may have an emitter layer containing light emitting chromophores that are anisotropic and substantially uniformly aligned. This OLED backlight is positioned and aligned such that the emitted light has its polarization axis parallel to the transmitting axis of the first sheet polarizer 110 so as to further increasing light utilization efficiency. Additionally, the profile and weight of a near UV or violet OLED backlight may be smaller than that of other backlights including, but not limited to fluorescent tube backlights. The reduced profile and weight are highly desirable for portable product applications such as lap top computers, cellular phones and the like.

The backlight assembly 105 may contain a light collimating sheet to collimate the light emitted from the monochromatic light source into collimated light before entering the first linear sheet polarizer 110. The collimated light has a significantly reduced divergent angle. The backlight assembly 105 also may contain a light recycling mechanism to convert all the light emitted from the monochromatic light source into polarized and collimated light with predetermined state of polarization before entering the first linear sheet polarizer 110.

Figure 5:
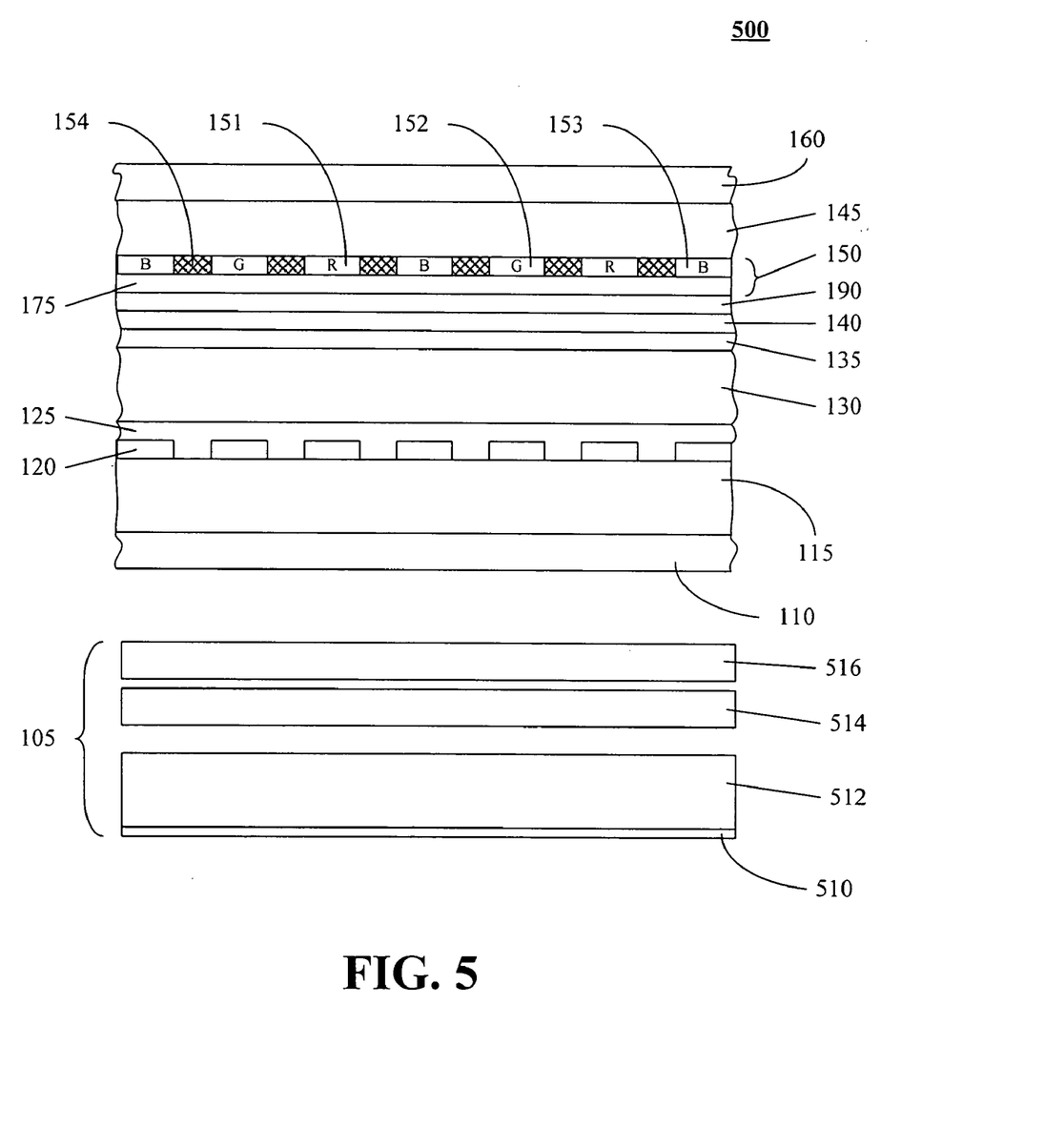
FIG. 5 illustrates an exemplary color display device according to another embodiment of the invention.

For example, FIG. 5 illustrates an exemplary color display device 500 according to another embodiment of the invention that includes such an exemplary backlight assembly 105. This backlight assembly 105 includes a reflective mirror 510, a monochromatic light source 512, a light collimating sheet 514 and non-absorptive polarizer sheet 516. The light from the monochromatic light source 512 is collimated or its divergent angle is dramatically reduced by the light collimating sheet 514. The non-absorptive polarizer sheet 516 transmits light in predetermined polarization state and reflects light in the orthogonal polarization state. The light reflected downwards by the non-absorptive polarizer sheet 516 will be reflected upwards by the reflective mirror 510 and adopt the predetermined polarization state. The light with the predetermined polarization state then passes through the non-absorptive polarizer sheet 516 and the optical switching element to excite the anisotropically photoluminescent color elements 151, 152, 153 or pass through the transparent or scattering elements. The non-absorptive polarizer 516 may be, for example, a linear polarizer made with multi-layer structure, or circular polarizer made with cholesteric liquid crystal polymer. In the case of circular non-absorptive polarizer, a quarter wave plate may be combined with the polarizer to convert the circular polarized light with predetermined state of polarization into linear polarized light with the predetermined state of polarization. The quarter wave plate may be laminated on the top side of the non-absorptive circular polarizer. The light collimating sheet 514 may be a prismatic structure, a lenticular lens array, micro-lens array or any other suitable structure. The reflective mirror 510 may be laminated or directly coated onto the light source 512 and the light source 512 may be transparent monochromatic OLED, or the one containing fluorescent tube and wave guiding and light diffusing elements.

Liquid crystal alignment layers 125 and 135 may be configured such that the liquid crystal layer 130 has some affect on the polarized light emerging from polarizer 110. This may be simply to transmit the polarized light through liquid crystal layer to the array of anisotropically photoluminescent color elements 150 or alternatively to alter the polarization state of the transmitted light. A means of applying an electric potential difference (not shown) between the array of transparent electrodes 120 and the transparent counter electrode or electrodes 140 is also provided. Passive and active matrix configurations and addressing schemes that selectively apply the desired electric potential difference to the individual display elements are well known in the art. When a sufficient electric potential difference is applied to electrodes of a display element the state of the liquid crystal layer 130 at that element is disturbed by interaction with the resultant electric field. This in turn alters the way in which the liquid crystal layer 130 interacts with the polarized light transmitted through polarizer 110. Light emerging from liquid crystal layer 130 passes into the array of anisotropically photoluminescent color elements 150. The polarization state of the light exiting the liquid crystal layer 130 can be resolved into two orthogonal components, one parallel to the axis of maximum absorption of the anisotropic electroluminescent material in the color elements, the other perpendicular to that axis. The light exciting the liquid crystal layer that is polarized parallel to the color element absorption axis substantially interacts with the luminescent materials in the anisotropically photoluminescent color elements 151, 152, 153 to produce polarized photoluminescence. The light that is polarized orthogonal to the color element absorption axis does not substantially interact with the luminescent materials to produce light. If the relative orientations of first sheet polarizer 110, the absorption axis for the anisotropically photoluminescent color elements 151, 152, 153, and the liquid crystal layer 130 are chosen properly, the application of a sufficient electric field across one pair of elements of the display electrodes switches the liquid crystal layer 130 from a state allowing the anisotropically photoluminescent color element 151, 152, 153 to emit maximum light to a state allowing no light emission. Thus, a high visual contrast between field-on and field-off display elements may be obtained. Alternatively, the "on" and "off" states may be reversed with the field-off state emitting substantially no light and the field-on state emitting photoluminescent light. The function of the second sheet polarizer 160 is to "clean up" any photoluminescent light that is emitted with its axis of polarization orthogonal to the polarization axis of the emitter thus potentially increasing display contrast, and also to enhance the viewability of the display under high ambient illumination. The second sheet polarizer 160 also may be selected to absorb UV light. Alternatively, a separate element may be included to absorb UV light. Such a separate element may be a PMMA plate coated with an antireflective material.

Advantageously, the loss of about one-half of the backlight output due to absorption at the first sheet polarizer 110 is avoided by using polarized OLED backlight or backlight assembly 105 containing light collimating and recycling elements. Similarly, the loss of about two-thirds of the backlight output due to absorption in the color filter is avoided because the array of anisotropically photoluminescent color elements 150 is used instead of color filters. These two light utilization efficiency increases may be combined to yield a display having a very high luminous efficacy.

The array of transparent electrodes 120 and the transparent counter electrode or electrodes 140 may be formed from indium-tin oxide (ITO), tin oxide, similar oxide conductive materials, conductive polymers, highly doped semiconductor materials and may be other materials. When the backlight assembly 105 emits near UV or violet light, wide band gap transparent conductors may be used for the array of transparent electrodes 120 and the transparent counter electrode or electrodes 140. Examples of such materials are described in Wang, A.; Edleman, N. L.; Babcock, J. R.; Marks, T. J.; Lane, M. A.; Brazis, P.; Kannewurf, C. R. Metal-Organic Chemical Vapor Deposition of In—Zn—Sn—O and In—Ga—Sn—O Transparent Conducting Oxide Thin Films, *MRS Symposium Series,* 2000, 607, 345-352, which is incorporated herein by reference. Zinc-indium-tin oxide has a band gap of 6.2 electron volts as opposed to 4.7 volts for indium-tin oxide. The wider band gap may improve the resultant display device by providing a blue-shifted absorption edge that allows higher transparency in the violet and near UV wavelengths.

Figure 2:
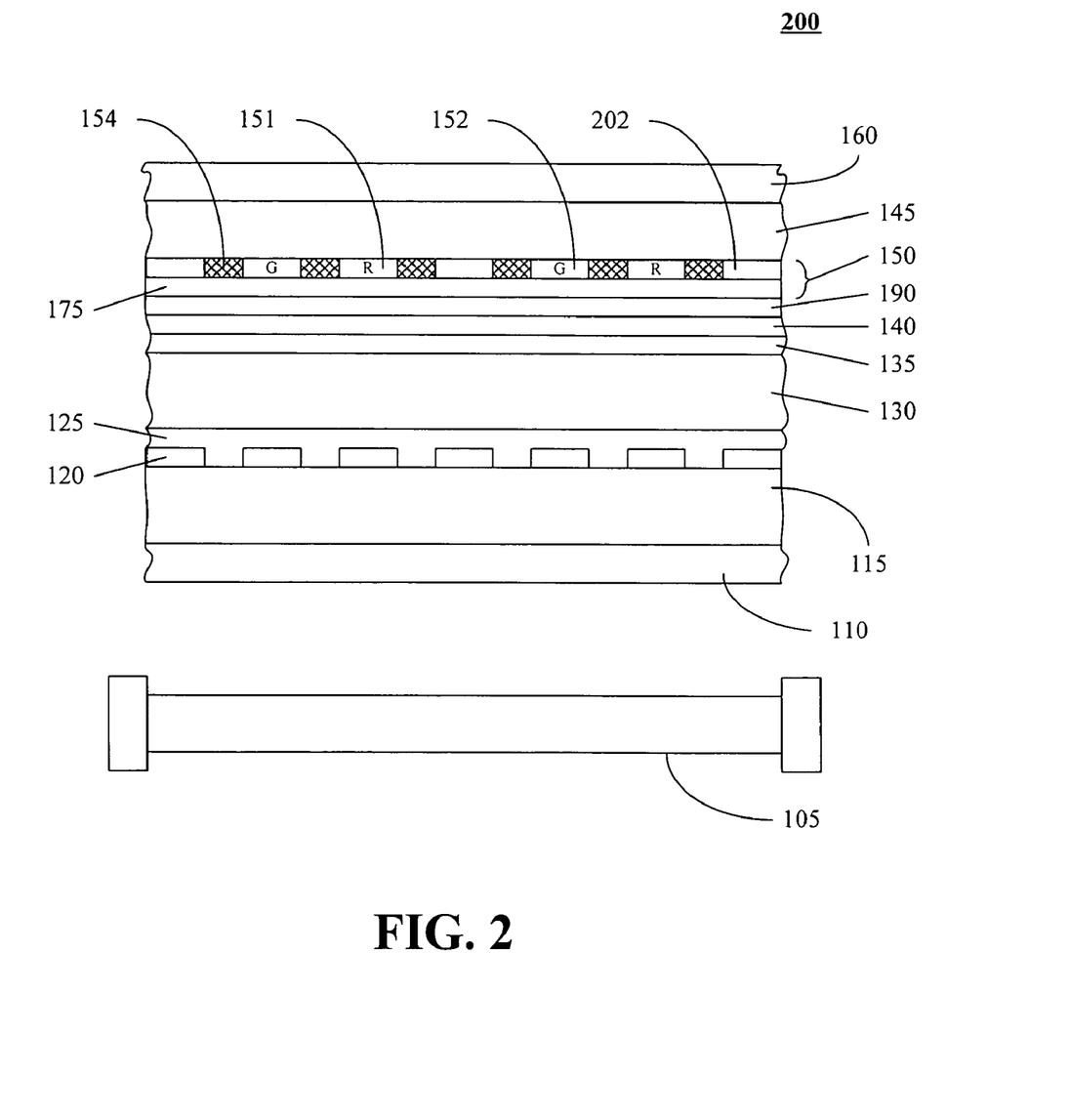
FIG. 2 illustrates an exemplary color display device according to another embodiment of the invention.

The absorption of many photoluminescent materials increases as the wavelength moves into the violet and near UV range from red and green wavelengths. Depending upon the material used, this absorption may be substantial although these materials are sufficiently transparent across the longer wavelength range in visible spectrum. To avoid this problem, a transparent or scattering element 202 may be substituted for the anisotropically photoluminescent material in the blue photoluminescent color elements 153 in embodiment illustrated in FIG. 1, and a blue (e.g., a wavelength of 455 to 492 nm) anisotropically emitting OLED backlight assembly 105 may be used in the modified color display device 200 as is illustrated in FIG. 2. The red and green photoluminescent color elements 151, 152 of FIG. 2 utilize luminescent materials whose excitation spectrum is chosen to strongly overlap the blue emission band because the backlight assembly 105 emits blue light. Since the blue segments of the modified color display device 200 include the transparent film 202, the second polarizer 160 is no longer optional, but required. The change of source light from a wavelength of approximately 400 nm to one of approximately 460 nm for the light transmitting electrodes leads to a considerable increase in light utilization efficiency.

One advantage of converting a monochromatic light source into a plurality of different colors is that the thickness of the switching element may be designed for a single wavelength of light rather than for several (e.g., three) different wavelengths of light. This simplifies design and improves the performance of the resultant color display. For example, when a liquid crystal switching element is used, the liquid crystal layer is tuned to maximize transmission in the non-transmissive or black state, or alternatively, to maximize transmission in the transmissive or white state of the device. For example, it is well known that the fraction of light transmitted by a normally white 90° twisted nematic liquid crystal display (LCD) is given by:

$$T = 1 - \frac{\sin^2\left[\frac{\pi}{2}\sqrt{1 + \left(\frac{2\Delta nd}{\lambda}\right)^2}\right]}{1 + \left(\frac{2\Delta nd}{\lambda}\right)^2}$$

Thus, for a given wavelength ($\lambda$) of near UV, violet, or blue light emitted by the backlight assembly 105, and for a given liquid crystal birefringence ($\Delta n$) at that wavelength, the above equation allows one to calculate a liquid crystal layer thickness d at which brightness is maximized in the white or unenergized state of the LCD. The dependence of T on d is, in fact, an oscillatory function that begins at zero for d=0, rises to a maximum at some thickness value (generally referred to as the "first minimum"), drops again, rises to a second local maximum (the "second minimum"), and continues to oscillate up and down as d is increased. Since in conventional color dot-matrix twisted nematic LCDs, $\lambda$ is different for each of red, green, and blue, the optimum value of d at the first or second minimum is different for each color. In practice what is usually done in conventional displays is to tune d to either the first or second minimum for the green wavelength. Unfortunately, the red and blue pixels of the display are therefore not optimized which results in degraded performance characteristics such as reduced color stability over field of view.

With a twisted nematic switching element, the light from the backlight assembly 105 exits the first polarizer 110 with its polarization axis substantially parallel to the long axes of the liquid crystal molecules at the surface of the layer of liquid crystal 130 nearest first linear sheet polarizer 110. The direction of the liquid crystal molecules' long axes rotates approximately 90° up through the thickness of the layer of liquid crystal 130 until at the surface nearest the anisotropically photoluminescent color elements 150 and substantially in the plane of layer of liquid crystal 130. The polarization axis of the light passing through the layer of liquid crystal 130 is rotated approximately 90° along with molecular long axes. The axis of maximum absorption of the array of anisotropically photoluminescent color elements 150 substantially aligned with the polarization axis of the light exiting surface. Since the light passing through layer of liquid crystal 130 is monochromatic for all of the pixels, tuning the thickness of the layer of liquid crystal 130 to the first or second minimum may be done for a single wavelength. This avoids the performance trade offs that normally occur with non-monochromatic light, which improves both the "on" state brightness for all of the displayed colors and increases color stability over field of view. A similar advantage may be obtained for normally black twisted nematic switching elements (e.g., local minimums of minimum transmission) and other types of liquid crystal switching elements where thickness is wavelength dependent.

Another example of a liquid crystal switching element is an electrically controlled birefringence (ECB) switching element. For this switching element, the directions of the long axes of the molecules in layer of liquid crystal 130 are all substantially in the plane of the layer of liquid crystal 130 and at an angle of 45° with the polarization axis of the first linear sheet polarizer 110. The axis of maximum absorption of the array of anisotropically photoluminescent color elements 150 is at an angle of 45° with the directions of the long axes of the molecules in the layer of liquid crystal 130 and at an angle of 90° with the first linear sheet polarizer 110. The function the layer of liquid crystal 130 in this exemplary device is to act as an electrically switchable half wave retarder plate. For a wavelength of λ for the backlight the display thickness should be:

$$d = \frac{\lambda}{2\Delta n}.$$

Since the thickness of the layer of liquid crystal 130 is directly proportional to wavelength, the "white" state of the conventional ECB displays tends to be highly colored. However, if such an ECB configuration is used as the switching element in the photoluminescent color display device and the liquid crystal layer thickness d is tuned to the optimum value for the blue, violet near UV or other output light of the anisotropically emitting OLED backlight, coloration problems of displaying white will be eliminated and color stability over field of view enhanced. This same approach is useful for any liquid crystal switching element in which the liquid crystal layer acts as an electrically switchable retarder. For example, ferroelectric liquid crystal switching elements.

Figure 3:
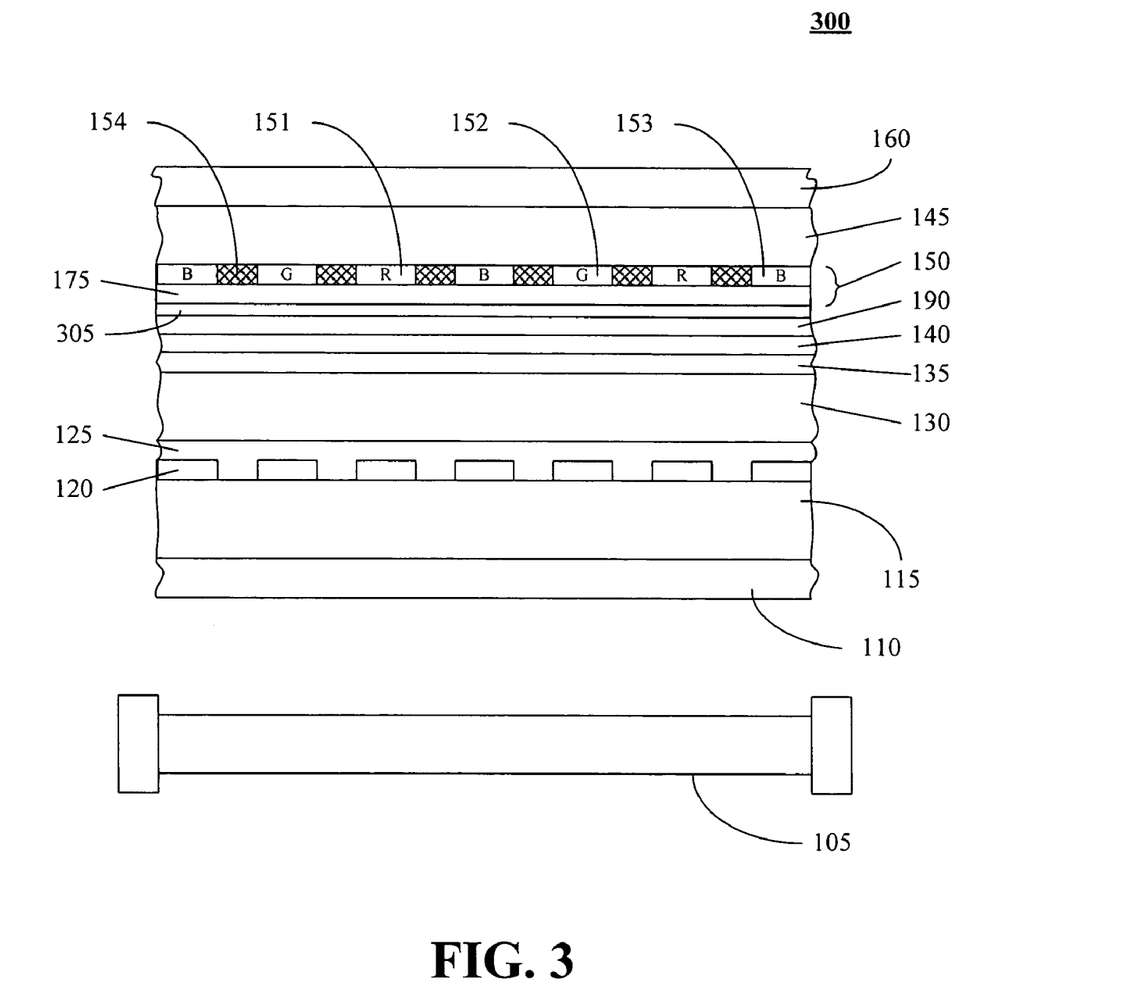
FIG. 3 illustrates an exemplary color display device includes a birefringent film compensator according to another embodiment of the invention.
Figure 4:
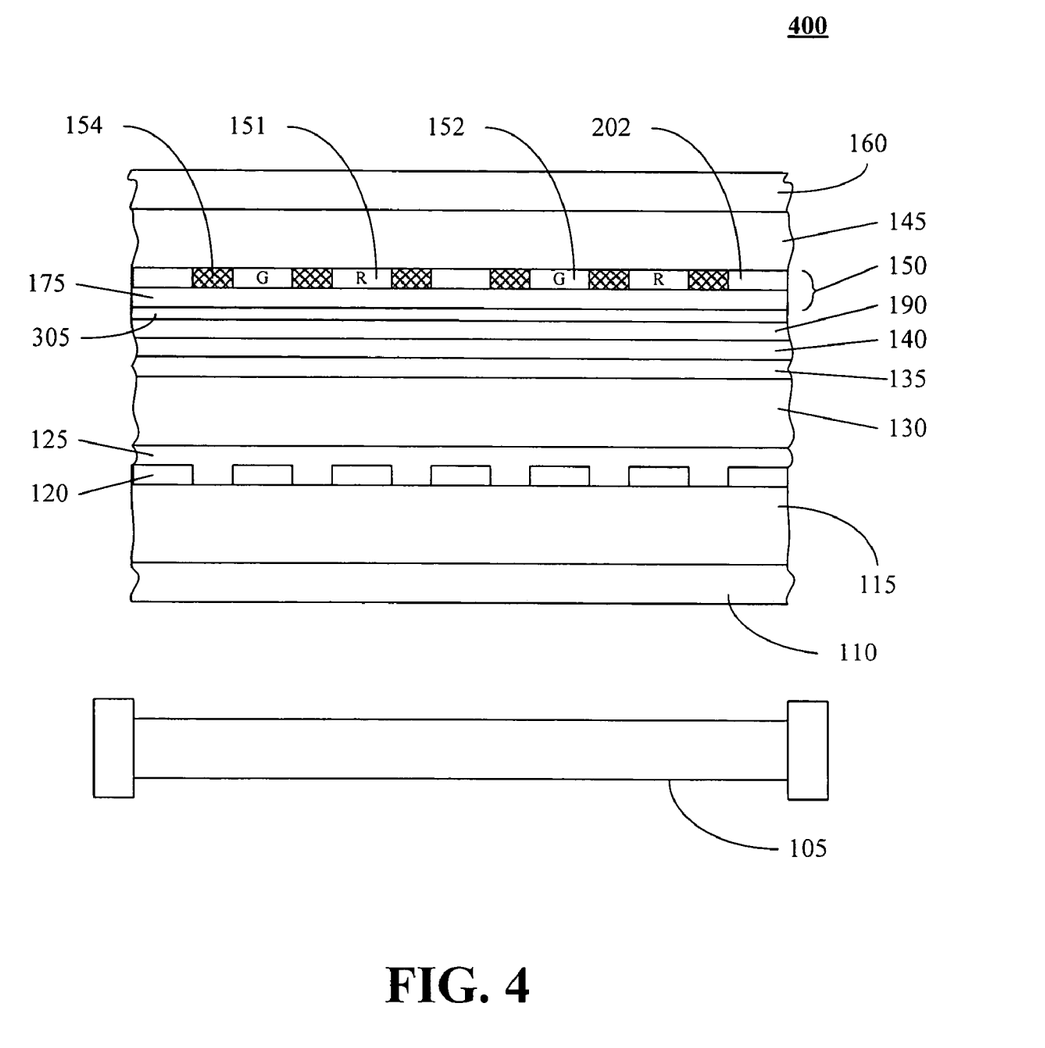
FIG. 4 illustrates an exemplary color display device includes a birefringent film compensator according to another embodiment of the invention.

FIG. 3 illustrates an exemplary color display device 300 similar to the color display device 100 of FIG. 1 that includes a birefringent film compensator 305 and FIG. 4 illustrates an exemplary color display device 400 similar to the color display device 200 of FIG. 2 that includes a birefringent film compensator 305. The birefringent film compensator 305 is interposed between the transparent counter electrode or electrodes 140 and the array of anisotropically photoluminescent color elements 150 and may be any of the birefringent film compensators that are well known in the industry. Alternatively, the birefringent film compensator 305 may be interposed between the first linear sheet polarizer 110 and first transparent electrode or electrodes 120. The birefringent film compensator 305 is used to decrease the variation in polarization state with increasing angle from the display normal of light entering anisotropically photoluminescent elements 151, 152, 153, and second linear sheet polarizer 160 through the transparent element 202. This reduction in angular variation in polarization state leads to an increase in the field of view over which the displayed data can be seen with high contrast. These birefringent film compensators 305 include one or more layers of birefringent material and generally are interposed between the transparent counter electrode or electrodes 140 and the array of anisotropically photoluminescent color elements 150 or between the first linear sheet polarizer 110 and first transparent electrode or electrodes 120.

The birefringent film compensator 305 of the color display devices 300, 400 of FIG. 3 and FIG. 4 may be formed from one or more film layers selected from the following: film layers with uniaxial birefringence of either positive or negative value and the extraordinary axis normal to the plane of the film layer, film layers with uniaxial birefringence of either positive or negative value and the extraordinary axis in the plane of the film layer, film layers with uniaxial birefringence of either positive or negative value and the extraordinary axis oriented at an angle intermediate between one normal to the plane and one in the plane of the film layer, film layers with uniaxial birefringence in which the direction of the extraordinary axis splays from one angle to the normal to a second angle to the normal as one traverses upward through the film layer (the splay angle may change continuously or discretely) or the angle of the extraordinary axis twists azimuthally around the normal as one traverses upward through the film layer (the twist angle may change continuously or discretely) or both splays and twists as one traverses upward through the film layer, film layers with biaxial birefringence with optical axes in an arbitrary direction or any other suitable birefringent films layer or layers. The birefringent film compensator may be composed of quite thin deposited layers with a total thickness of from less than one micron to a few microns.

The liquid crystal switching elements discussed herein may be any suitable type of liquid crystal device known in the art. For example, the liquid crystal may be twisted nematic, super twisted nematic, ferroelectric, and any other suitable liquid crystal material. The electrode and driving structure of the liquid crystal switching elements may be active, passive, in plane switched or the more commonly across the plane switched. Yet another alternative is to have the switching element be a non-liquid crystal switching element. For example, the switching element could be a lithium niobate switching element, a digital mirror, a transflective element, a LCOS element or any other suitable optical switching element.

Figure 6:
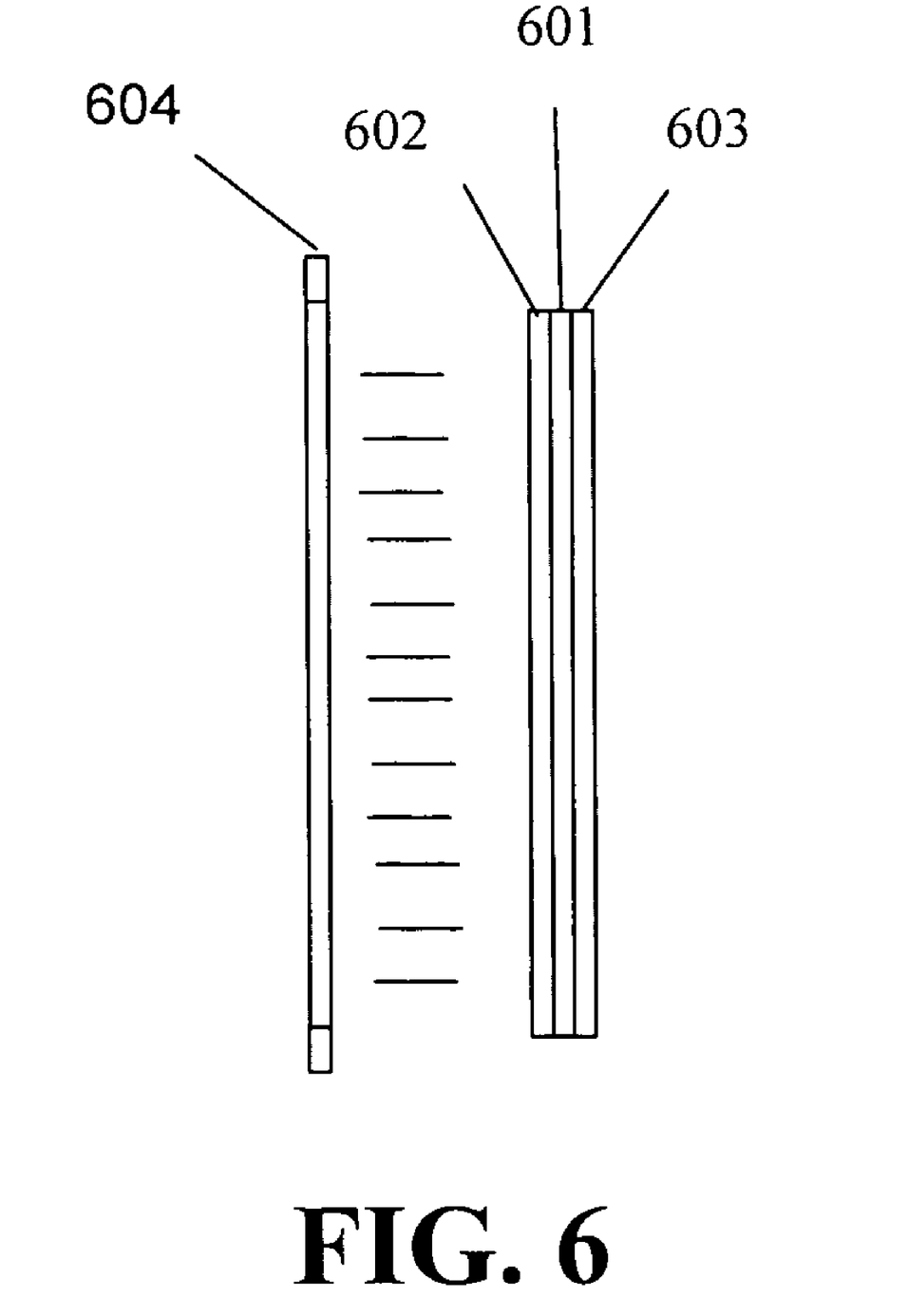
FIG. 6 illustrates a photoluminescent film device may be lit by a polarized light source.

FIG. 6 illustrates a photoluminescent film device may be lit by a polarized light source. In this case the device might include a film of polymerized anisotropically emitting reactive mesogen 601, a first wavelength selective reflector 602, and a second wavelength selective reflector 603. The first wavelength selective reflector 602 reflects photoluminance light emitted by the photoluminescent film forward away from the light source 604 while transmitting light emanating from the light source into the photoluminescent film 601 where it is absorbed by the photoluminescent chromophores. Also, the second wavelength selective reflector 603 reflects light wavelengths that are absorbed by the photoluminescent chromophores while transmitting light wavelengths emitted by the photoluminescent chromophores.

These photoluminescent polarized light emitting device may include a film produced by the polymerization of an aligned film of a mixture of one or more photoluminescent reactive mesogens and optionally including one or more wavelength selective reflectors. The wavelength selective reflector may transmit light of wavelengths absorbed by the photoluminescent reactive mesogen chromophores, but reflects light of wavelengths emitted by the one or more photoluminescent reactive mesogen chromophores. Alternatively, the wavelength selective reflector may transmit light of wavelengths emitted by the one or more photoluminescent reactive mesogen chromophores, but reflects light of wavelengths absorbed by the photoluminescent reactive mesogen chromophores. The wavelength selective reflector may be placed adjacent the surface of the polymerized photoluminescent reactive mesogen film that is opposite the side from which photoluminescence light is intended to emerge. Alternatively, the wavelength selective reflector may be placed adjacent the surface of the polymerized photoluminescent reactive mesogen film from which photoluminescence is intended to emerge.

The one or more photoluminescent reactive mesogens may have the molecular formula: B-S-A-S-B, wherein B is an endgroup that is susceptible to photopolymerization, S is a flexible spacer, and A is a photoluminescent chromophore. The photopolymerization of endgroup B may be initiated by free radicals. The chromophore A may have the general formula: —(Ar—Fl)$_n$—Ar—, wherein Ar is an aromatic diradical or a heteroaromatic diradical bonded linearly or substantially linearly to adjoining diradicals, or a single bond, Fl is a 9,9-dialkyl substituted fluorene diradical joined to adjoining diradicals at the 2 and 7 positions, the Ar and Fl diradicals may be chosen independently in each of the n subunits of the chromophore; and where $1 \leq n \leq 10$, but preferably $3 \leq n \leq 10$. Exemplary endgroups B include 1,4-pentadien-3-yl radicals, acrylates, and methacrylates. The polymerized material may further include a non-luminescent reactive mesogen.

The material to be polymerized may be aligned by an alignment layer. For example, the alignment layer may be a rubbed polymer, a rubbed polyimide, a photoalignment layer or any other suitable alignment layer.

The polymerization of the photoluminescent material may be photopolymerization. As such, the photoluminescent material may be subdivided into pixels or areas. Those pixels or areas may respectively emit light of two, three, or more different wavelength bands, and/or may respectively emit light of two or more different orientations of linear polarization. The subdivision into pixels may be effected by photo-patterning.

The display devices disclosed herein may be configured such that they form photoluminescent polarizers such as disclosed in U.S. Pat. No. 6,594,062, which is incorporated herein in its entirety by this reference.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

We claim:

1. A color display comprising:
   a monochromatic light source;
   an array of pixel elements;
   a liquid crystal optical switch between the monochromatic light source and the array of pixels elements;
   a first wavelength selective reflector provided between said monochromatic light source and said array of pixel elements; and
   a second wavelength selective reflector provided across said array of pixel elements at a position facing said first wavelength selective reflector,
   wherein at least some of the array of pixels elements include anisotropically emitting photoluminescent material;
   said first wavelength selective reflector transmits light emanated from said monochromatic light source and reflects light emitted by said anisotropically emitting photoluminescent material; and
   said second wavelength selective reflector reflects light emanated from said monochromatic light source and transmits the light emitted by said anisotropically emitted photoluminescent material.

2. The display of claim 1, wherein the monochromatic light source emits a violet or near UV spectrum.

3. The display of claim 1, wherein the monochromatic light source emits blue light.

4. The display of claim 1, wherein the monochromatic light source emits polarized light.

5. The display of claim 4, wherein the monochromatic light source is an anisotropically emitting organic light emitting device light source.

6. The display of claim 1, wherein the array of pixel elements include a plurality of different color emitting photoluminescent materials.

7. The display of claim 6, wherein the plurality of different color emitting photoluminescent materials emits two different colors of light.

8. The display of claim 7, wherein the array of pixel elements include a transmissive or scattering element.

9. The display of claim 7, wherein the two different colors of light are red and green light and the monochromatic light source emits blue light.

10. The display of claim 6, wherein the plurality of different color emitting photoluminescent materials emits three different colors of light.

11. The display of claim 10, wherein the three different colors of light are red, green and blue light.

12. The display of claim 1,
   wherein the anisotropically emitting photoluminescent material emits light when illuminated by light having a predetermined polarization; and
   wherein the anisotropically emitting photoluminescent material emits substantially no light when illuminated by light having a polarization orthogonal to the predetermined polarization.

13. The display of claim 1, wherein the liquid crystal optical switch include a liquid crystal layer.

14. The display of claim 1, wherein the liquid crystal layer has a thickness selected according to a wavelength of the monochromatic light source.

15. The display of claim 14, wherein the thickness corresponds to a local maximum of maximum transmission.

16. The display of claim 14, wherein the thickness corresponds to a local minimum of minimum transmission.

17. The display of claim 1, wherein the optical switch includes transparent conductors of wide band gap material.

18. The display of claim 1, wherein the optical switch includes a birefringent compensator.

19. The display of claim 1, wherein the optical switch provides gray scale control.

20. A method of displaying a color image comprising:
   generating a monochromatic light;
   absorbing at least a portion of the modulated monochromatic light with anisotropically emitting photoluminescent material by transmitting the portion of the modulated monochromatic light through a first wavelength selective reflector;
   modulating the monochromatic light with a liquid crystal optical switch such that modulated monochromatic light results;
   selectively converting at least the portion of the modulated monochromatic light into light of different wavelengths with the anisotropically emitting photoluminescent material;
   reflecting a portion of the modulated monochromatic light that is not absorbed with the anisotropically emitting photoluminescent material with a second wavelength selective reflector and further absorbing the portion of the modulated monochromatic light with the anisotropically emitting photoluminescent material; and
   transmitting the light of different wavelengths converted by the anisotropically emitting photoluminescent material through the second wavelengths selective reflector.

21. The method of claim 20, wherein the monochromatic light is violet or near UV light.

22. The method of claim 20, wherein the monochromatic light is blue light.

23. The method of claim 20, wherein the monochromatic light is polarized light.

24. The method of claim 23, wherein the polarized light is emitted by an anisotropically emitting organic light emitting device light source.

25. The method of claim 20, wherein the anisotropically emitting photoluminescent material includes a plurality of different color emitting photoluminescent materials.

26. The method of claim 25, wherein the plurality of different color emitting photoluminescent materials emits two different colors of light.

27. The method of claim 26, further comprising selectively transmitting at least a portion of the modulated monochromatic light without conversion to a different wavelength.

28. The method of claim 26, wherein the two different colors of light are red and green light and the monochromatic light is blue light.

29. The method of claim 25, wherein the plurality of different color emitting photoluminescent materials emits three different colors of light.

30. The method of claim 29, wherein the three different colors of light are red, green and blue light.

31. The method of claim 20,
wherein the anisotropically emitting photoluminescent material emits light when illuminated by the modulated monochromatic light having a predetermined polarization; and
wherein the anisotropically emitting photoluminescent material emits substantially no light when illuminated by the modulated monochromatic light have a polarization orthogonal to the predetermined polarization.

32. The method of claim 20, wherein the modulating the monochromatic light is performed at least in part by a liquid crystal layer of the liquid crystal optical switch.

33. The method of claim 32, wherein the liquid crystal layer has a thickness selected according to a wavelength of the monochromatic light.

34. The method of claim 33, wherein the thickness corresponds to a local maximum of maximum transmission.

35. The method of claim 33, wherein the thickness corresponds to a local minimum of minimum transmission.

36. The method of claim 20, wherein the liquid crystal layer is actuated by transparent conductors of wide band gap material.

37. The method of claim 20, wherein the modulating the monochromatic light includes compensation by a birefringent compensator.

38. The method of claim 20, wherein the modulating the monochromatic light provides gray scale control.

39. The display of claim 1,
wherein said array of pixel elements includes a first surface and a second surface, said first surface is located closer to said monochromatic light source than said second surface, and
wherein said first wavelength selective reflector is located adjacent to said first surface of said array of pixel elements and said second wavelength selective reflector is located adjacent to said second surface of said array of pixel elements.

40. The display of claim 1, wherein said anisotropically emitting photoluminescent material has a formula B-S-A-S-B in which B represents an endgroup that is susceptible to photopolymerization, S represents a flexible spacer, and A represents a photoluminescent chromophore.

41. The display of claim 1, wherein
said anisotropically emitting photoluminescent material includes a photoluminescent chromophore, a flexible spacer and an endgroup that is susceptible to photopolymerization; and
said photoluminescent chromophore emits the light emitted by said anisotropically emitting photoluminescent material by absorbing the light emanated from said monochromatic light source.

42. The display of claim 41, wherein said photoluminescent chromophore has a formula —(Ar—Fl)$_n$—Ar in which Ar represents an aromatic diradical or a heterodiradical and Fl represents a 9,9-dialdyl substituted fluorene diradical.

43. The display of claim 42, wherein said n satisfies $1 \leq n \leq 10$.

44. The display of claim 42, wherein said n satisfies $3 \leq n \leq 10$.

45. The display of claim 41, wherein said endgroup that is susceptible to photopolymerization includes 1,4-pentadien-3-yl radicals, acrylate or methacrylate.

46. The display of claim 41, wherein said flexible spacer includes an alkyl group.

47. The display of claim 41, wherein said anisotropically emitting photoluminescent material includes at least one of:

48. The method of claim 20,
further comprising providing an array of pixel elements including a first surface and a second surface, said first surface is located closer to where said monochromatic light is generated than said second surface,
wherein said first wavelength selective reflector is located adjacent to said first surface of said array of pixel elements and said second wavelength selective reflector is located adjacent to said second surface of said array of pixel elements.

49. The method of claim 20, wherein said anisotropically emitting photoluminescent material has a formula B-S-A-S-B in which B represents an endgroup that is susceptible to photopolymerization, S represents a flexible spacer, and A represents a photoluminescent chromophore.

50. The method of claim 20, wherein
said anisotropically emitting photoluminescent material includes a photoluminescent chromophore, a flexible spacer and an endgroup that is susceptible to photopolymerization; and
said photoluminescent chromophore emits the light emitted by said anisotropically emitting photoluminescent material by absorbing the light emanated from said monochromatic light source.

51. The method of claim 50, wherein said photoluminescent chromophore has a formula —(Ar—Fl)$_n$—Ar in which Ar represents an aromatic diradical or a heterodiradical and Fl represents a 9,9-dialdyl substituted fluorene diradical.

52. The method of claim 51, wherein said n satisfies $1 \leq n \leq 10$.

53. The method of claim 51, wherein said n satisfies $3 \leq n \leq 10$.

54. The method of claim 50, wherein said endgroup that is susceptible to photopolymerization includes 1,4-pentadien-3-yl radicals, acrylate or methacrylate.

55. The method of claim 50, wherein said flexible spacer includes an alkyl group.

56. The method of claim 50, wherein said anisotropically emitting photoluminescent material includes at least one of:

* * * * *